US012001186B2

(12) United States Patent
Ishii et al.

(10) Patent No.: US 12,001,186 B2
(45) Date of Patent: Jun. 4, 2024

(54) INFORMATION PROCESSING METHOD, INFORMATION PROCESSING APPARATUS, PRODUCTION SYSTEM AND ARTICLE MANUFACTURING METHOD

(71) Applicant: CANON KABUSHIKI KAISHA, Tokyo (JP)

(72) Inventors: Daiki Ishii, Niigata (JP); Tomoaki Makino, Aichi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 62 days.

(21) Appl. No.: 17/195,810

(22) Filed: Mar. 9, 2021

(65) Prior Publication Data
US 2021/0294294 A1   Sep. 23, 2021

(30) Foreign Application Priority Data

Mar. 23, 2020   (JP) .................................. 2020-051683

(51) Int. Cl.
  *G05B 19/05*   (2006.01)
(52) U.S. Cl.
  CPC .. *G05B 19/056* (2013.01); *G05B 2219/13004* (2013.01)
(58) Field of Classification Search
  CPC ........ G05B 19/056; G05B 2219/13004; G05B 2219/13147; G06Q 10/06311; G06Q 10/103; G06Q 50/04
  See application file for complete search history.

(56) References Cited

U.S. PATENT DOCUMENTS

| 5,581,678 A * | 12/1996 | Kahn .................... G06T 11/206 |
| | | 345/440 |
| 2005/0197723 A1* | 9/2005 | Harada .............. G05B 19/4093 |
| | | 700/85 |
| 2015/0346710 A1* | 12/2015 | Hirose ................. G05B 19/401 |
| | | 700/28 |
| 2021/0182101 A1* | 6/2021 | Mizuno .............. G05B 19/0426 |

FOREIGN PATENT DOCUMENTS

| JP | 5-333907 A | 12/1993 |
| JP | 7-191717 A | 7/1995 |
| JP | 9-222909 A | 8/1997 |
| JP | 2019-3353 A | 1/2019 |
| WO | 2013/161561 A1 | 10/2013 |

OTHER PUBLICATIONS

Hiraoka Yoshiaki, "Method for Analyzing Operational State of Control Object Device" (machine translation), Jun. 16, 2017, Espacenet machine translation (Year: 2017).*

(Continued)

*Primary Examiner* — Christopher W Carter
(74) *Attorney, Agent, or Firm* — VENABLE LLP (57) ABSTRACT

An information processing method includes acquiring a time chart indicating operation lines corresponding to operations of a plurality of control objects and interlocking modes between the operations, and generating a sequence program corresponding to the operations of the plurality of control objects based on the time chart.

30 Claims, 7 Drawing Sheets

(56) References Cited

OTHER PUBLICATIONS

Tanaka Hiroaki, "Automatic Preparing Device for Control Program" (machined translation), Feb. 5, 1992, Espacenet machine translation (Year: 1992).*
Fukui Toshito, "Device for inspecting sequence program" (ip.com English Translation for Application JP 2000-3292), Jan. 7, 2000, ip.com translation (Year: 2000).*
Mizuno Masao, "Method and system for creating sequence program, and sequence control system" (ip.com English translation for application JP 2006-99622), Apr. 13, 2006, ip.com translation (Year: 2006).*
Nishizawa Akira, "Sequence program creation method" (ip.com English translation for application JP 2574813), Jan. 22, 1997, ip.com translation (Year: 1997).*
Japanese Office Action dated Nov. 14, 2023 during prosecution of related Japanese application No. 2020-051683 (English-Language machine translation included).

* cited by examiner

| UNIT NAME | OPERATION NAME | DRIVING METHOD | IO NUMBER | | OPERATING DIRECTION | 217 |
|---|---|---|---|---|---|---|
| | | | OUTPUT SIGNAL | COMPLETE SIGNAL | | |
| Unit A | POSITIONING | 2PD | Y100 | X100 | CLOSE | |
| | | 2PD | Y101 | X101 | OPEN | |
| | MACHINING | RB | D10000 | P10 | MACHINING OPERATION | |
| | | RB | D10000 | P1 | ORIGINAL POINT | |
| | CONVEYANCE X | RB | D10010 | X100 | GO | |
| | | RB | D10010 | X101 | RETURN | |
| Unit B | CONVEYANCE Z | RB | D10020 | P2 | DESCEND | |
| | | RB | D10020 | P1 | ASCEND | |
| | CHUCK | 2PS | Y110 | X110 | CLOSE | |
| | | | | X111 | OPEN | |

OPERATION TIMING DATA 501

| UnitName | Drive | Out Adress | In Adress | Start Time | End Time |
|---|---|---|---|---|---|
| UnitB | RB | D10020 | P2 | 0.5 | 0.6 |
| UnitA | RB | D10000 | P10 | 0.9 | 1.8 |
| UnitC | RB | D10040 | P1 | 2.4 | 2.5 |
| UnitA | 2PD | Y101 | In X101 | 2.1 | 2.2 |
| UnitB | RB | D10010 | P2 | 0.3 | 0.5 |
| UnitB | RB | D10020 | P2 | 0.0 | 0.1 |
| UnitC | 2PS | Y120off | In X121 | 2.8 | 2.9 |
| UnitB | RB | D10020 | P1 | 0.2 | 0.3 |
| UnitA | RB | D10000 | P1 | 1.8 | 2.1 |
| UnitB | RB | D10020 | P1 | 0.7 | 0.8 |
| UnitC | RB | D10040 | P1 | 2.9 | 3.0 |
| UnitB | 2PS | Y110off | In X111 | 0.6 | 0.7 |
| UnitC | RB | D10030 | P2 | 1.0 | 1.2 |
| UnitC | RB | D10030 | P1 | 2.5 | 2.7 |
| UnitA | 2PD | Y100 | In X100 | 0.8 | 0.9 |
| UnitB | RB | D10010 | P1 | 0.8 | 1.0 |
| UnitC | RB | D10040 | P2 | 2.7 | 2.8 |
| UnitC | RB | D10040 | P2 | 2.2 | 2.3 |
| UnitC | 2PS | Y120on | In X120 | 2.3 | 2.4 |
| UnitB | 2PS | Y110on | In X110 | 0.1 | 0.2 |

SYNCHRONIZATION DATA 502

| StartUnit | StartType | InterFaceCoil | StartTime | EndUnit | EndType | EndTime |
|---|---|---|---|---|---|---|
| UnitC | Kyoka | Mc1 | 0.3 | UnitB | KyokaWait | 0.3 |
| UnitB | Kannryo | Mb1 | 0.5 | UnitC | KannryoWait | 0.5 |
| UnitA | Kyoka | Ma1 | 0.5 | UnitB | KyokaWait | 0.5 |
| UnitB | Kannryo | Mb2 | 0.8 | UnitA | KannryoWait | 0.8 |
| UnitB | Kyoka | Mb3 | 1.0 | UnitC | KyokaWait | 1.0 |
| UnitC | Kannryo | Mc2 | 1.2 | UnitB | KannryoWait | 1.2 |
| UnitA | Kyoka | Ma2 | 2.2 | UnitC | KyokaWait | 2.2 |
| UnitC | Kannryo | Mc3 | 2.5 | UnitA | KannryoWait | 2.5 |

FIG.6

OPERATION SEQUENCE DATA

600

| UnitName | Drive | Out Adress | In Adress | Start Time | End Time | InterFaceType | InterFaceCoil |
|---|---|---|---|---|---|---|---|
| UnitA | | | | 0.5 | 0.5 | Kyoka | Ma1 |
| UnitA | | | | 0.8 | 0.8 | KannyoWait | Mb2 |
| UnitA | 2PD | Y100 | In X100 | 0.8 | 0.9 | | |
| UnitA | RB | D10000 | P10 | 0.9 | 1.8 | | |
| UnitA | RB | D10000 | P1 | 1.8 | 2.1 | | |
| UnitA | 2PD | Y101 | In X101 | 2.1 | 2.2 | | |
| UnitA | | | | 2.2 | 2.2 | Kyoka | Ma2 |
| UnitA | | | | 2.5 | 2.5 | KannyoWait | Mc3 |

| UnitName | Drive | Out Adress | In Adress | Start Time | End Time | InterFaceType | InterFaceCoil |
|---|---|---|---|---|---|---|---|
| UnitB | RB | D10020 | P2 | 0.0 | 0.1 | | |
| UnitB | 2PS | Y110a | In X110 | 0.1 | 0.2 | | |
| UnitB | RB | D10020 | P1 | 0.2 | 0.3 | | |
| UnitB | | | | 0.3 | 0.3 | KyokaWait | Mc1 |
| UnitB | RB | D10010 | P2 | 0.3 | 0.5 | | |
| UnitB | | | | 0.5 | 0.5 | Kannryo | Mb1 |
| UnitB | | | | 0.5 | 0.5 | KyokaWait | Ma1 |
| UnitB | RB | D10020 | P2 | 0.5 | 0.6 | | |
| UnitB | 2PS | Y110b | In X111 | 0.6 | 0.7 | | |
| UnitB | RB | D10020 | P1 | 0.7 | 0.8 | | |
| UnitB | | | | 0.8 | 0.8 | Kannryo | Mb2 |
| UnitB | RB | D10010 | P1 | 0.8 | 1.0 | | |
| UnitB | | | | 1.0 | 1.0 | Kyoka | Mb3 |
| UnitB | | | | 1.2 | 1.2 | KannryoWait | Mc2 |

| UnitName | Drive | Out Adress | In Adress | Start Time | End Time | InterFaceType | InterFaceCoil |
|---|---|---|---|---|---|---|---|
| UnitC | | | | 0.3 | 0.3 | Kyoka | Mc1 |
| UnitC | | | | 0.5 | 0.5 | KannryoWait | Mb1 |
| UnitC | | | | 1.0 | 1.0 | KyokaWait | Mb3 |
| UnitC | RB | D10030 | P2 | 1.0 | 1.2 | | |
| UnitC | | | | 1.2 | 1.2 | Kannryo | Mc2 |
| UnitC | | | | 2.2 | 2.2 | KyokaWait | Ma2 |
| UnitC | RB | D10040 | P2 | 2.2 | 2.3 | | |
| UnitC | 2PS | Y120a | In X120 | 2.3 | 2.4 | | |
| UnitC | RB | D10040 | P1 | 2.4 | 2.5 | | |
| UnitC | | | | 2.5 | 2.5 | Kannryo | Mc3 |
| UnitC | RB | D10030 | P1 | 2.5 | 2.7 | | |
| UnitC | RB | D10040 | P2 | 2.7 | 2.8 | | |
| UnitC | 2PS | Y120b | In X121 | 2.8 | 2.9 | | |
| UnitC | RB | D10040 | P1 | 2.9 | 3.0 | | |

FIG.7

INFORMATION PROCESSING METHOD, INFORMATION PROCESSING APPARATUS, PRODUCTION SYSTEM AND ARTICLE MANUFACTURING METHOD

BACKGROUND OF THE INVENTION

Field of the Invention

The present invention relates to an information processing method.

DESCRIPTION OF THE RELATED ART

A sequence program is used to control operations of devices disposed in a production line. As a control unit executing the sequence program of this sort, a controller called as a sequencer or a programmable logic controller (PLC) is used. Then, as one of output modes of the sequence program, a so-called ladder circuit is widely adopted.

The devices controlled by the sequencer or the PLC are production devices, such as robots that manipulate tools and conveyor units for example, having structural elements or units such as a conveyance portion, an assembly portion and a machining portion composed of groups of operation axes of a plurality of driving shafts which are objects to be controlled.

Hitherto, in order to efficiently prepare such sequence program, there has been known an arrangement of setting sequential operation timing of each operation axis of the control object in a time chart and of setting a time chart of each operation axis based on a relationship with input/output addresses as disclosed in Japanese Patent Application No. H07-191717.

According to the arrangement described in Japanese Patent Application No. 1407-191717, it is necessary for a user to read the operation timing of the operation axis and to describe the setting assuming the sequence program in the time chart as a complementary explanation for example. With regard this point, Japanese Patent Application No. H05-333907 discloses an arrangement of preparing a sequence program by describing control data that synchronizes operational timing of each operation axis in a table part of a time chart.

There is a case where the control unit such as the PLC and the sequencer synchronously operate independently operable units of an automatic assembling machine in accordance to the sequence program. However, such an arrangement requires a time chart by which a plurality of related units is mutually related. Due to that, in a case of setting timing of sequential operations of operation axes which are control objects in one sheet of time chart as disclosed in Japanese Patent Application No. H07-191717, it is difficult to describe the timing by which units in operation synchronously operate with each other by exchanging synchronizing signals and acknowledgment signals. Still further, in a case of setting the timing of the operation axes of the control objects that cause exchanges of workpieces or the like in the same time chart, the operation timing of the operation axes merely ends up being timing of a same time base. Due to that, it is difficult to generate such sequence program that operates the units in an interlocking manner.

SUMMARY OF THE INVENTION

According to a first aspect of the present invention, an information processing method includes acquiring a time chart indicating operation lines corresponding to operations of a plurality of control objects and interlocking modes between the operations, and generating a sequence program corresponding to the operations of the plurality of control objects based on the time chart.

According to a second aspect of the present invention, an information processing apparatus includes a control portion, wherein the control portion acquires a time chart in indicating operation lines corresponding to operations of a plurality of control objects and an interlocking mode between the operations and generates a sequence program corresponding to the operations of the plurality of control objects based on the time chart.

Further features of the present invention will become apparent from the following description of exemplary embodiments with reference to the attached drawings.

DESCRIPTION OF THE EMBODIMENTS

A mode for carrying out the present disclosure will be described with reference to the appended drawings. Note that a configuration described below is one example to the end, and a detailed configuration for example may be appropriately modified by a person skilled in the art within a scope not departing from a gist of the present disclosure. Still further, numerical values taken up in the present exemplary embodiment are merely examples of referential numerical values.

Figure 1:
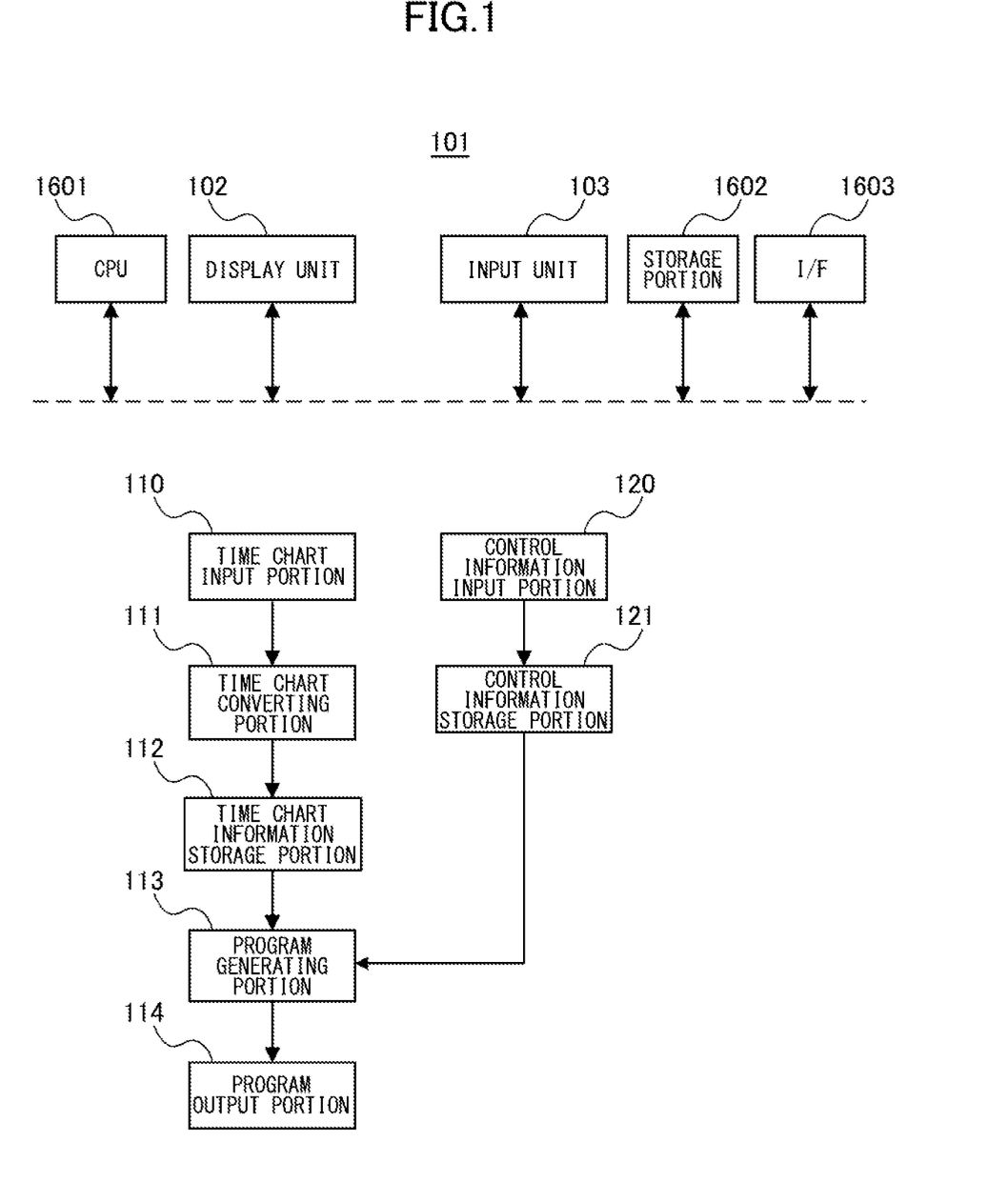
FIG. 1 is a block diagram schematically illustrating a configuration of an information processing apparatus configured to generate a sequence program.

A sequence program generating apparatus 101 which is an information processing apparatus of the present exemplary embodiment in FIG. 1 is a processor composed of a CPU 1601, memories 1602 and others and is controlled by a personal computer for example.

A display unit 102 is a display using a display device such as various display panels. An input unit 103 is composed of pointing devices such as a keyboard and a mouse. The display unit 102 and the input unit 103 constitute a user interface of the sequence program generating apparatus 101. For instance, this user interface can be composed of a GUI (graphic user interface) and can utilize an input operation system that operates a screen displayed on the display unit 102 by using the input unit 103.

The sequence program generating apparatus 101 includes functional blocks of a time chart input portion 110 that is configured to input a time chart, of a time chart converting portion 111 configured to convert the inputted time chart into a sequence data and of a time chart information storage portion 112 that is configured to store the converted time chart data.

The sequence program generating apparatus 101 also includes a control information input portion 120 configured to input an input/output address required for generating the sequence program and a model program. The sequence program generating apparatus 101 also includes a functional block of a control information storage portion 121 configured to store the inputted control information. The control information storage portion 121 includes a storage area of each data described later. The sequence program generating apparatus 101 also includes a sequence program generating portion 113 configured to generate the sequence program based on the stored time chart data and the control information. The sequence program generating apparatus 101 also includes a program output portion 114 configured to output the generated control program.

The respective functional blocks of the sequence program generating apparatus 101 described above can be realized by the CPU 1601 that executes the control programs stored in a ROM of the storage portion 1602. In such a case, a RAM of the storage portion 1602 is used as a work area of the CPU 1601. Beside the ROM of the storage portion 1602 or HDD not illustrated, the control program for realizing a control procedure described later can be stored in various optical or magnetic disks and semiconductor memory devices. Such storage medium storing the control programs that realize the present exemplary embodiment constitutes a computer-readable storage medium of the present disclosure. The control program realizing the present exemplary embodiment can be installed in the ROM 1602 or the HDD not illustrated or updated through the portable storage medium as described above. However, in a case where the control program is connected with various wired or wireless connected network not illustrated through the interface 1603 (I/F), the control program realizing the present exemplary embodiment can be installed or updated through the network.

Figure 2:
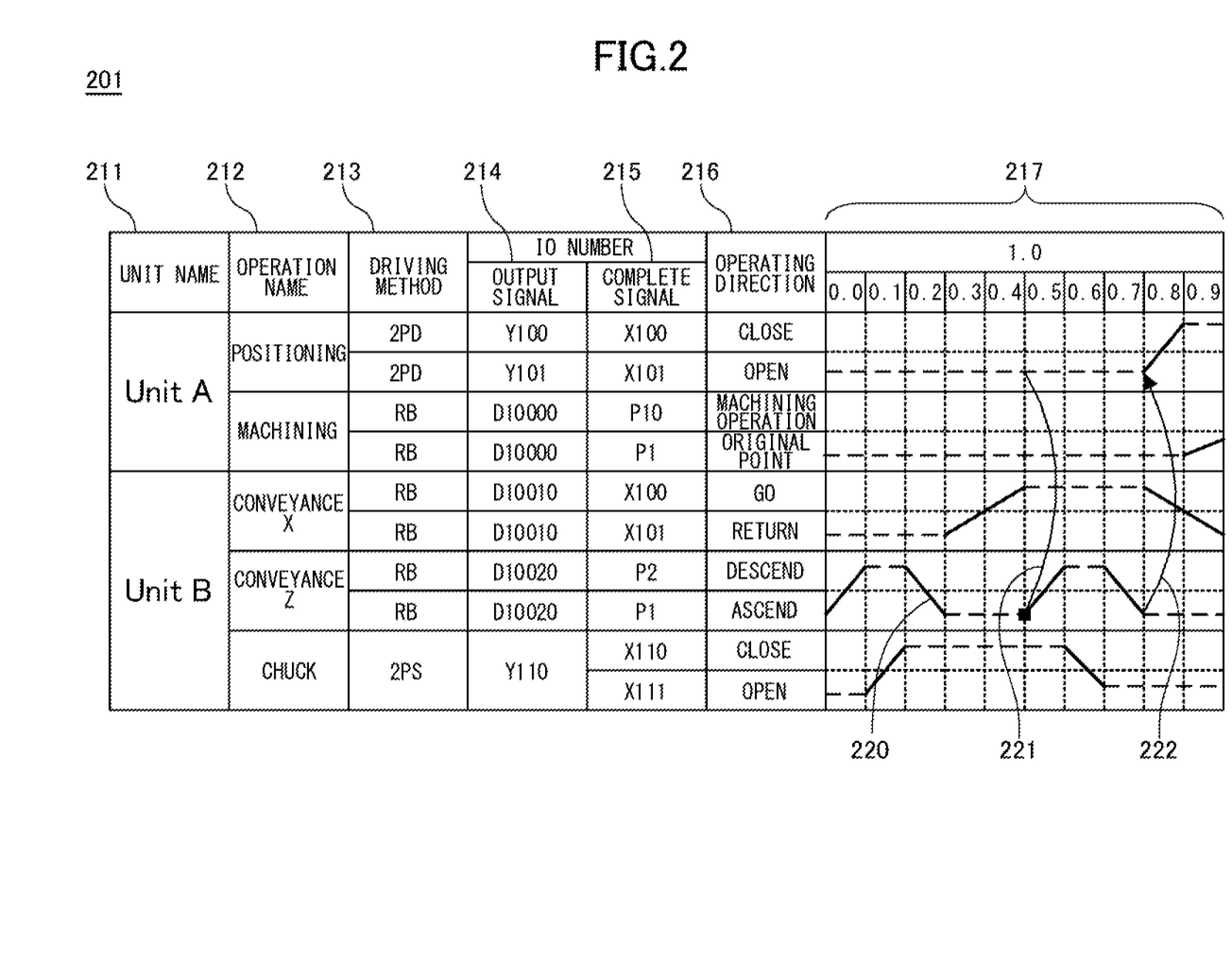
FIG. 2 schematically illustrates a time chart according to a present exemplary embodiment of the present disclosure.

FIG. 2 illustrates one example of a time chart 201 presumed in the present exemplary embodiment. The time chart 201 in FIG. 2 includes a column of Unit name 211 describing names of units included in the automatic assembling machine. The time chart 201 in FIG. 2 also includes columns of Operation name 212 describing an operation of a control object, i.e., an operation axis or a driving shaft, of the control object composing each unit and of Driving method 213 describing a method for operating and driving the operation axis.

The time chart 201 in FIG. 2 also includes columns of Output signal 214 and of Completion signal 215 required in controlling the driving method and of Operation direction 216 describing a direction of the operation. The time chart 201 in FIG. 2 also includes Time indicating portion 217 configured to indicate a time base in grids and an operation status transition line 220 that indicates a transition of an operation status of the operation axis of the control object by an oblique line. The time chart 201 in FIG. 2 also includes a synchronization enabling trigger line 221 and a synchronization completing trigger line 222 for synchronously operating the units and the operations of the units.

It is also noted in the time chart 201 in FIG. 2 that start points and end points of the operation status transition line 220, the synchronization enabling trigger line 221 and the synchronization completing trigger line 222 are located on extension lines of the grids of the Time indicating portion 217, respectively. In the time chart 201, the synchronization enabling trigger line 221 indicates that a synchronization enabling trigger signal, i.e., synchronizing signal trigger, is transmitted from the Unit A to a conveyance portion of a Z direction of the Unit B when an operation of positioning of the Unit A ends. Still further, the synchronization completing trigger line 222 indicates that a synchronization completion trigger signal, i.e., a synchronizing signal acknowledgment, is transmitted from a conveyance portion of the Z direction of the Unit B to the Unit A. Then, a terminal end of the synchronization enabling trigger line 221 is formed into a diamond shape or a rectangular shape and a terminal end of the synchronization completing trigger line 222 is formed into an arrowhead shape or a triangular shape. Operation lines of the respective Units are connected by the operation enabling trigger line and the synchronization completing trigger line indicating functions by the some terminal end symbols among the Units A, B and C on a left side of the time chart 201 in FIGS. 2 and 4 described later.

That is, the time chart 201 of the present exemplary embodiment has a specification that enables to describe synchronously operating interlocking relationships of the plurality of Units by mutually exchanging and transmitting/receiving the synchronizing signals composed of the synchronization enabling trigger signal, i.e., the synchronizing signal trigger, and the synchronization completing trigger signal, i.e., the synchronizing signal acknowledgment. This interlocking mode can be defined by graphical elements correlating the operation lines, e.g., arrows or interconnection lines in a case of FIG. 2, corresponding respectively to the plurality of Units. Then, in these arrows, it is possible to define the interlocking modes by the diamond shape or the rectangular shape at the terminal end of the synchronization enabling trigger, i.e., the synchronizing signal trigger, and by the arrowhead or the triangular shape at the terminal end of the synchronization completing trigger signal or the synchronizing signal acknowledgment.

Then, the GUI, i.e., the display unit 102 and the input unit 103, is arranged such that the user selects an item corresponding to either one of the synchronizing signal trigger/synchronizing signal acknowledgment from a pulldown menu for example in inputting the arrows. i.e., the interconnecting lines, indicating different interlocking, i.e., synchronizing, relationships. For instance, arrows, i.e., interconnecting lines, specifying an interlocking, i.e., synchronizing, relationship may be inputted by such methods of clicking both end positions by the pointing device such as the mouse of the input unit 103 or of dragging on a desirable line. In such a case, the CPU 1601 can immediately recognize whether the input of the graphical element by the click/drag input is correlated with the arrow, i.e., the interconnecting line, specifying the interlocking, i.e., synchronizing, relationships corresponding to either one of the synchronizing signal trigger/synchronizing signal acknowledgment.

Figure 4:
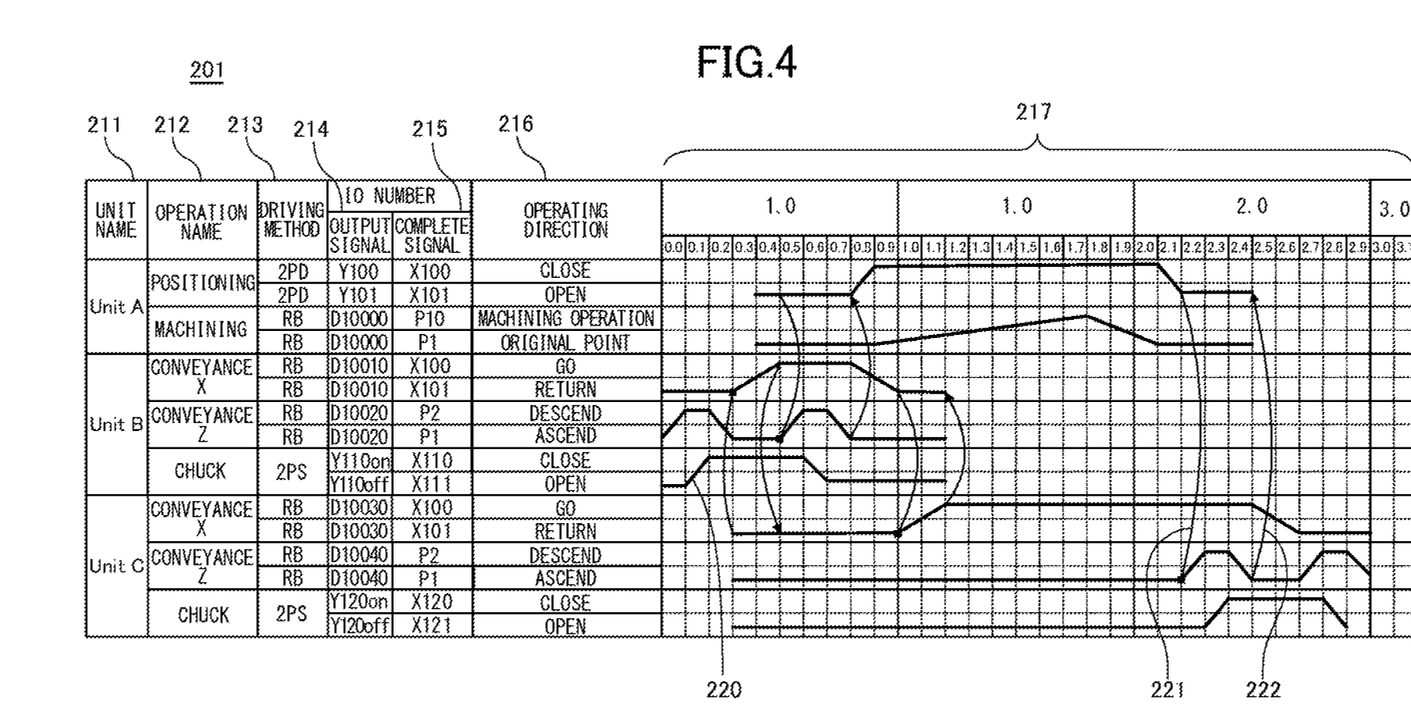
FIG. 4 illustrates an example of a time chart according to the present exemplary embodiment of the present disclosure.

However, the left side of the time chart 201 is configured by input fields in a form of a table as illustrated in FIGS. 2 and 4 in the GUI composed of the display unit 102 and the input unit 103 of the present exemplary embodiment. Then, the user can describe specifications of the operations of the Units in the table portion on the left side in FIG. 2. In the case of FIG. 2, the user can describe the corresponding specifications in the respective fields of Unit name 211, the operation name 212, the driving method 213, IO numbers related to the output signal 214 and the completion signal 215 and the operation direction 216.

Accordingly, in a case where the CPU 1601 is to recognize the specifications of the signals related to the arrows, i.e., the interconnecting lines, specifying the interlocking, i.e., synchronizing, relationships, the CPU 1601 can refer the information on the left side of the time chart 201 such as the Output signal 214, the Completion signal 215 and the Operation direction 216. In such a case, it is also possible to arrange so as to output an alarm/control error indicating an alarm message if the graphical elements specified by the click/drag input are contrary to the information on the left side of the time chart 201. This arrangement makes it possible to urge the user to operate so as to match the graphical elements with the information on the left side of the time chart 201.

Still further, in the case of using the GUI composed of the display unit 102 and the input unit 103, the CPU 1601 can handle the graphics in the diagram part, i.e., on the right par, of the time chart 201 in FIGS. 2 and 4 with the information in the table part, i.e., on the left side, in FIGS. 2 and 4 while mutually correlating with each other. For instance, in a case where edition or input is made on either one of the graphics of the diagram part on the right side or the table part on the left side, the CPU 1601 can update another one of the table part on the left side or the graphics of the diagram part on the right side. For instance, in a case where the synchronization enabling trigger line 221 or the synchronization completing trigger line 222 is inputted and edited in the graphics of the diagram part, the CPU 1601 can instantly recognize corresponding operation data and signal specifications in response to that. Then, the CPU 1601 can update contents of the respective fields 211 through 216 of the table part on the left side so as to match with the input and edit of the synchronization enabling trigger line 221 or the synchronization completing trigger line 222 in the graphics of the diagram part for example.

As described above, the time chart 201 of the present exemplary embodiment is arranged so as to be able to describe the operation mode by which the plurality of Units are mutually interlocked and synchronously operated by exchanging synchronizing signals for example by the graphical elements. Still further, in a case where the table part is disposed in the time chart 201, it is possible to correlate the graphical elements and characters and numerical data in the table part and to handle their edition and input in the interlocked manner by operations on the GUI.

Next, a method for converting the time chart of the present disclosure will be specifically described with reference to FIGS. 1 and 3. Firstly, a time chart is inputted through the time chart input portion 110 of the sequence program generating apparatus 101. The input is made through the input unit 103 in accordance to instructions displayed on the screen of the display unit 102. The display unit 102 and the input unit 103 constitute the user interface such as the GUI. The CPU 1601 starts a process of the time chart converting portion 111 when a time chart to be converted is specified from the user interface such as the input unit 103.

Figure 3:
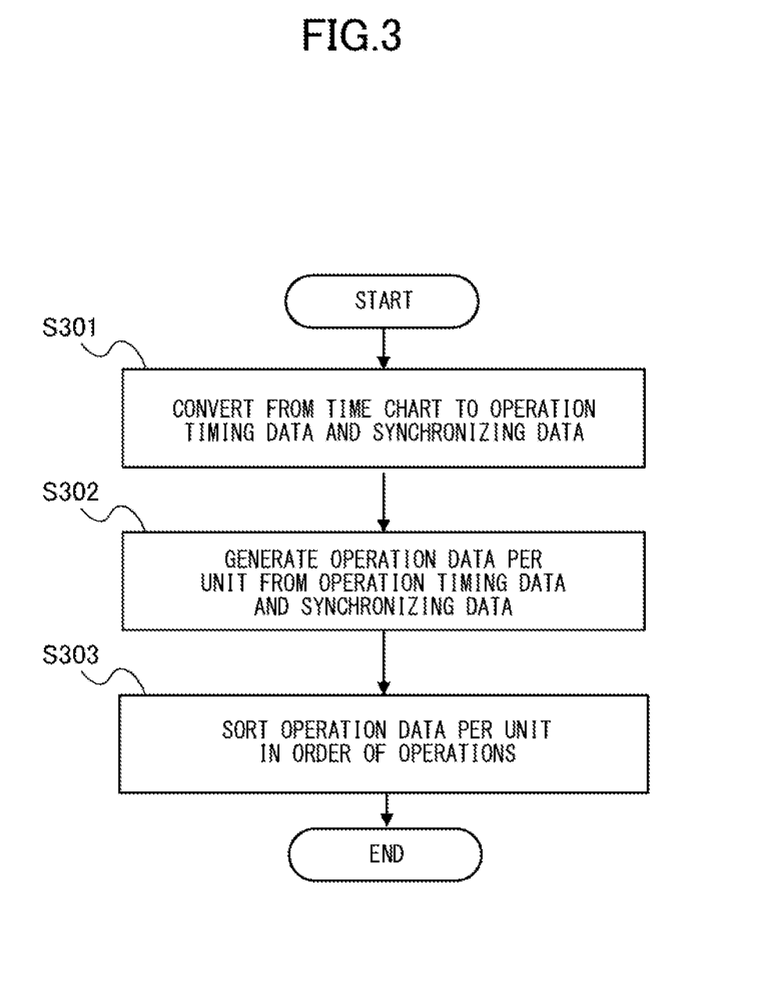
FIG. 3 is a flowchart illustrating a time chart converting method according to the present exemplary embodiment of the present disclosure.
Figure 5:
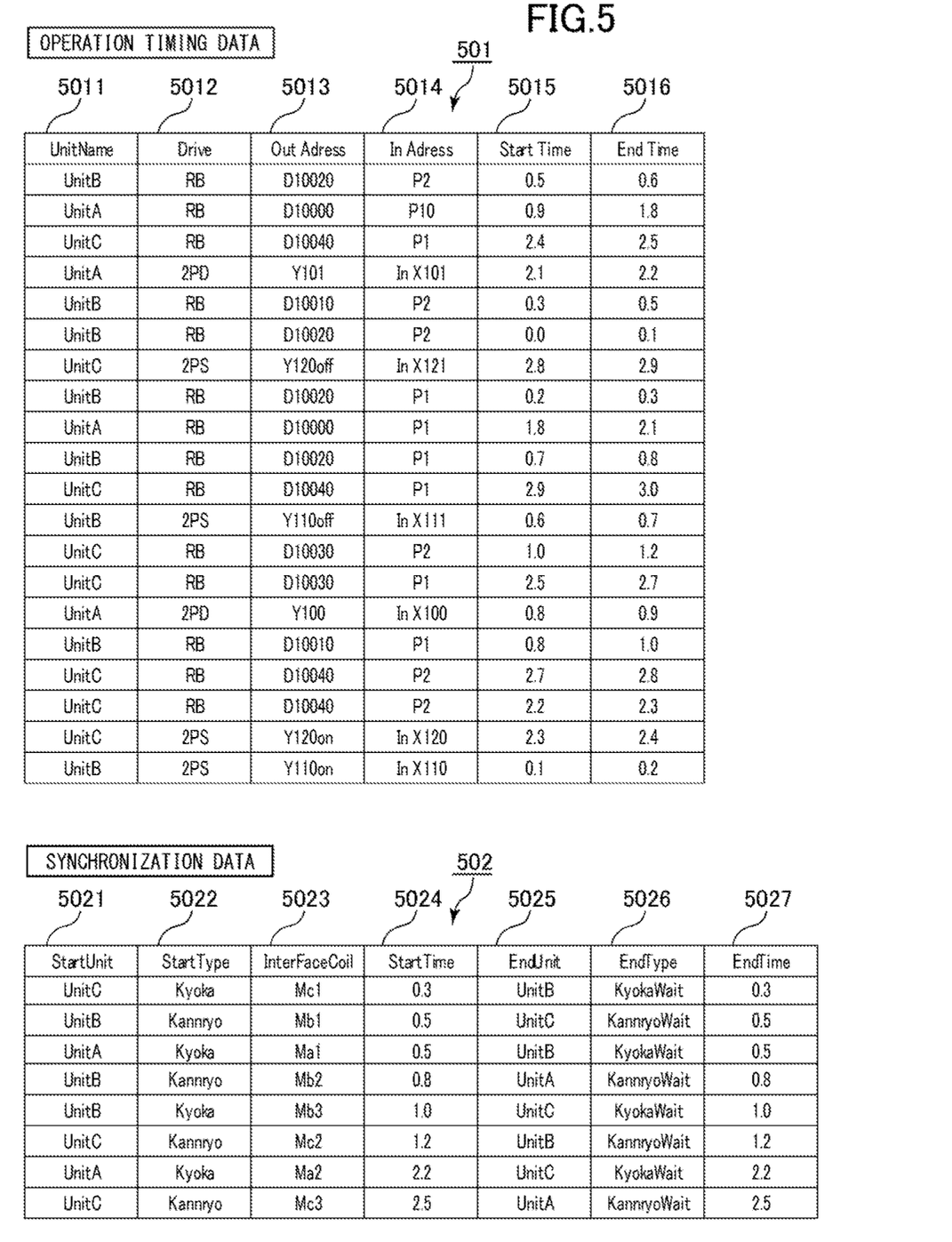
FIG. 5 illustrates an example of time chart conversion data.

In Step S301 in FIG. 3, the time chart converting portion 111 acquires operation timing data as illustrated in an upper part in FIG. 5 of a control object, e.g., an operation axis, from the time chart inputted from the time chart input portion 110. The time chart converting portion 111 also acquires synchronizing data as illustrated in a lower part in FIG. 5 required for synchronizing the Units with each other from the time chart inputted from the time chart input portion 110 in Step S301.

Next in Step S302, the time chart converting portion 111 acquires synchronizing signal rigger timing data that causes the operation enabling signal, i.e., the synchronizing signal, and the operation completion signal, i.e., the acknowledgment signal, to be outputted from receiving/transmitting side information of the synchronizing data. The time chart converting portion 111 also acquires the synchronizing signal acknowledgment timing data that acknowledges the synchronizing signals of the operation enabling signal, i.e., the synchronizing signal, and the operation completion signal, i.e., the acknowledgment signal, from the information of the receiving/transmitting side of the synchronizing data. Then, correlating these operation timing data and the synchronizing signal trigger timing data the time chart converting portion 111 stores the synchronizing signal acknowledgment timing data as operation data per Unit.

Next, the time chart converting portion 111 sorts the operation data per Unit so as to match with an operation sequence in Step S303 to convert and output as operation sequence data per Unit. This operation sequence data per Unit is stored in the time chart information storage portion 112.

A process in generating the sequence program of the present exemplary embodiment will be described below with reference to FIG. 1. Information required for generating the sequence program such as allotment of internal device addresses and model of the sequence program is registered in the control information storage portion 121 in FIG. 1. This data is registered in the control information storage portion 121 by operating the input unit 103 in accordance to screen messages displayed by the display unit 102.

The sequence program generating portion 113 generates the sequence program by changing model data stored in the control information storage portion 121 corresponding to sequence control data per Unit within the time chart information storage portion 112. For instance, the sequence program generating portion 113 generates the sequence program by converting address changed parts of the model of the sequence program registered in the control information storage portion 121 based on the operation sequence data per Unit and the allotment of the internal device addresses. As the sequence program, the sequence program generating portion 113 generates a progress management program managing sequential operations and an output program for outputting operation commands, respectively.

Note that the sequence program per Unit is generated such that the sequential operation is started by a start command, a step count of the sequential operation is reset as a series of the sequential operation is completed, and operations are repeated from beginning of the sequential operation until when the start command expires. The generated sequence program is outputted in a file form that can be registered in the PLC through the sequence program output portion 114.

While the present disclosure will be specifically described below by exemplifying an exemplary embodiment, the present disclosure is not limited to the following exemplary embodiment.

First Exemplary Embodiment

A sequence program will be generated from the time chart illustrated in FIG. 4 for example in the present exemplary embodiment.

Firstly, the time chart converting portion 111 registers a model program of the sequence program and the allotment of the internal device addresses in the control information storage portion 121. One of circuits registered in the model of the progress management program managing the sequential operation of the sequence is a circuit, i.e., a condition circuit, of a pattern of advancing to a next step after acknowledging a completion of an operation of the operation axis of the control object.

Still further, one of the circuits registered in the model of the progress management program is Permission completion waiting circuit. This circuit, i.e., the Permission completion waiting circuit, is what acknowledges synchronizing timing of the Units. That is, the Permission completion waiting circuit is a circuit of a pattern of advancing to a next step by outputting an operation enabling signal of an interference operation to an opposite Unit and by acknowledging an output of a completion signal informing that the interference operation has been completed from the Unit to which the enabling signal has been outputted.

Another one of the circuits registered in the model of the progress management program is a circuit of a pattern of advancing to a next step by acknowledging an enabling signal of an interference operation, i.e., the Permission waiting circuit. A still another circuit registered in the model of the progress management program is a circuit of a pattern of causing the Unit to which the enabling signal of the interference operation had been outputted to output a completion signal informing that an operation of the interference operation has been completed and of acknowledging that the output of the enabling signal with respect to the interference operation is expired, i.e., a completion circuit.

Circuits of a two-position double solenoid circuit for an electromagnetic valve and a two-position single solenoid and a dedicated circuit for driving a robot are prepared to drive operating axes of the control object in the output signal. The enabling signal and the completion signal which are signals of synchronous timing of the Units are also registered. Operation commands of the respective output programs are sequentially converted to the steps of the operations. Each operation command is continuously outputted until when a condition of the progressing step is met. The operation command is deactivated as the progressing step advances. The internal device addresses are allocated so as not overlap with addresses of coils, i.e., driving portions, used in the sequence program.

When the time chart in FIG. 4 is inputted by the time chart input portion 110, the time chart converting portion 111 generates sequence control data. In Step S301 in FIG. 3, the time chart converting portion 111 converts the time chart into the operation timing data and the synchronizing data. In generating the operation timing data in Step S301, the time chart converting portion 111 contrasts positions of starting and ending points of the operation status transition line 220 with the grids of the Time indicating portion 217 to calculate respective times of the starting point side as an operation starting time and of the ending point side as an operation ending time. Still further, the time chart converting portion 111 extracts a unit name described in the Unit name 211 on the end side, a driving method described in the Driving method 213, output signal information described in the Output signal 214 and completion signal information described in the Completion signal 215 of the time chart in FIG. 4, respectively.

Then, based on specifications of the time information, the synchronizing signal or the acknowledgement, i.e., completion, signal read from the inputted time chart, the time chart converting portion 111 acquires the operation timing data as illustrated in an upperpart of FIG. 5. The operation timing data in FIG. 5 includes columns of Unit name 5011, i.e., UnitName, Driving method 5012, i.e., Drive, and Output signal information 5013, i.e., OutAddress. The operation timing data in FIG. 5 also includes columns of Completion signal information 5014, i.e., InAddress, Operation starting time 5015, i.e., StartTime, and Operation ending time 5016, i.e., EndTime.

Meanwhile, the time chart converting portion 111 generates synchronizing data 502 as illustrated in a lower part of FIG. 5 from graphical elements corresponding to synchronization enabling trigger and synchronization completing trigger read from the inputted time chart. That is, the time chart converting portion Ill contrasts positions of starting and ending points of the synchronization enabling trigger line 221 or the synchronization completing trigger line 222 in FIG. 4 with the grids of the Time indicating portion 217 to calculate respective times of the starting point side as an operation starting time and of the ending point side as an operation ending time. Still further, the time chart converting portion 111 extracts Unit names described in the Unit name 211 of the starting and ending point sides, respectively. The synchronizing data as illustrated in the lower part of FIG. 5 includes Information 5026 discriminating types of the synchronizing signal or the acknowledgment, i.e., completion, signal or the trigger lines. In the Information 5026, information of Kyoka meaning permission is applied to the starting point if a shape of the terminal end is diamond and information of Kanryo meaning completion is applied to the starting side if the shape of the terminal ending is arrowhead. Still further, in the Information 5026, information of Kyokawait meaning to wait for permission is applied to the ending side if the starting side is permitted and information of KanryoWait meaning to wait for completion is applied to the ending side if the starting side is completed.

This synchronizing data 502 illustrated in the lower part of FIG. 5 includes a starting side Unit name 5021, i.e., StartUnit and an ending side Unit name 5025, i.e., EndUnit, read from the time chart. The synchronizing data 502 illustrated in the lower part of FIG. 5 also includes Operation starting time 5024, i.e., StartTime, and Operation ending time 5027, i.e., EndTime, serving as ending timing. The synchronizing data 502 in the lower part of FIG. 5 also includes starting side Trigger line type 5022, i.e., StartType, and ending side Trigger line type 5026, i.e., EndType.

The time chart converting portion 111 repeatedly executes the conversion of the operation timing data 501 and the synchronizing data 502 described above, i.e., Step S301 in FIG. 3, on all of the operation status transition line 220, i.e., the operation lines, the synchronization enabling trigger line 221 and the synchronization completing trigger line 222 in the time chart. Still further, the time chart converting portion 111 allocates the addresses of the internal devices to the coils of the synchronizing signals in generating the sequence program in the synchronizing data 502 in the lower part of FIG. 5. To that end, the time chart converting portion 111 sorts the operations in an order from the earliest operation starting time 5024, i.e., StartTime, contrasts them with the starting side Unit name 5021, i.e., StartUnit, and applies Coil numbers 5023, i.e., InterFaceCoil, per Unit in serial numbers in the order from the earliest operation starting time. Thus, the time chart converting portion 111 generates the operation timing data 501 and the synchronizing data 502 as illustrated in the upper and lower parts of FIG. 5 respectively.

Figure 6:
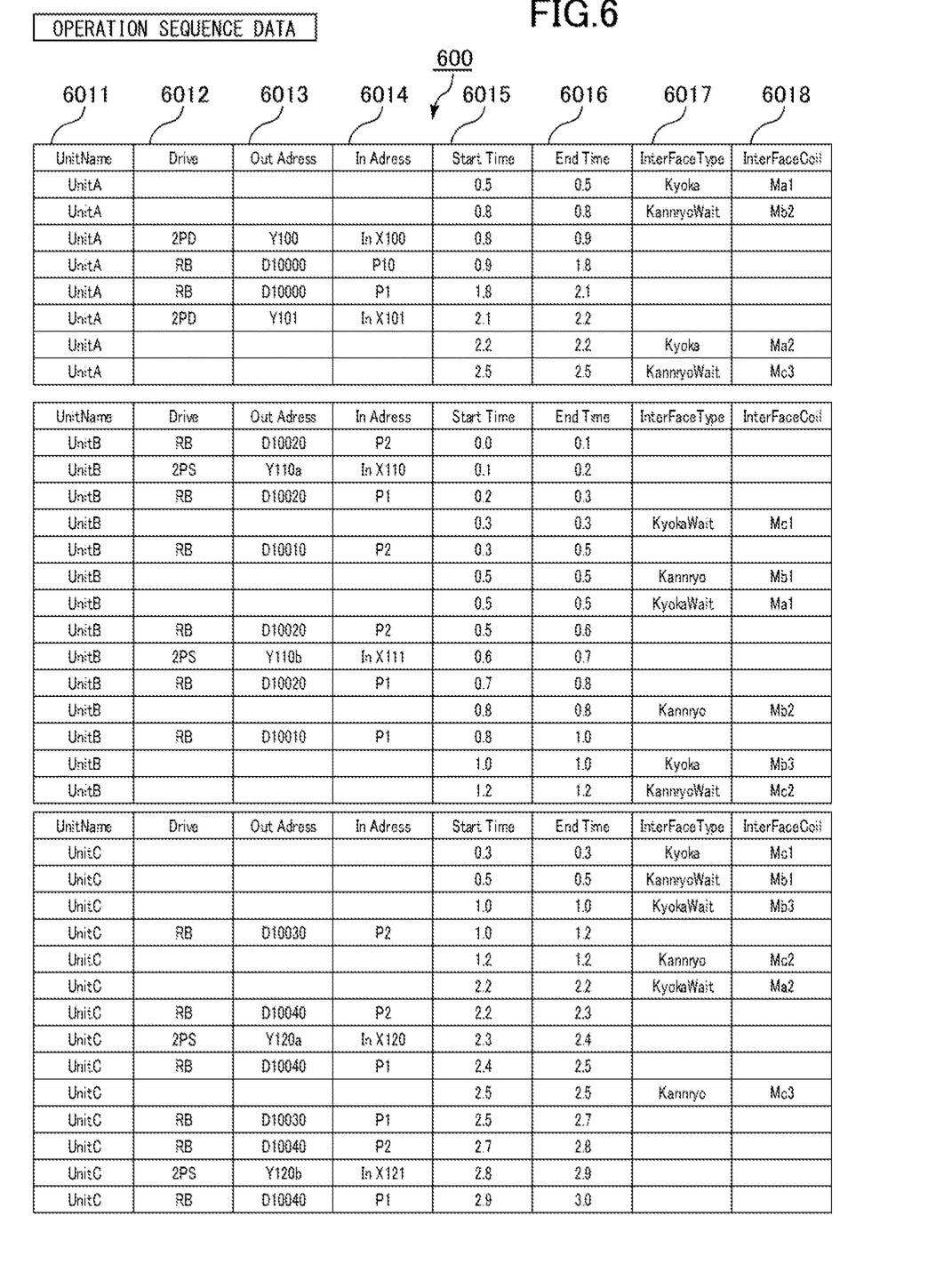
FIG. 6 illustrates an example of operation sequence data.

Next, the time chart converting portion 111 generates the operation data to be disposed in the sequence program from the operation timing data 501 and the synchronizing data 502 in Step S302 in FIG. 3. Here, the time chart converting portion 111 assigns the operation timing data per Unit in order to generate the operation data per Unit from the operation timing data 501 and the synchronizing data 502 separately stored. In succession, the time chart converting portion 111 generates timing for outputting an operation enabling signal and an operation completing signal from the stored synchronizing data. To that end, the time chart converting portion 111 extracts the starting side Unit name 5021, i.e., StartUnit, in the synchronizing data 502 in the lower part in FIG. 5. Then, based on the extracted starting side Unit name 5021, i.e., StartUnit, the time chart converting portion 111 applies the following control information to the operation timing data assigned per Unit. Thereby, the time chart converting portion 111 can generate operation sequence data 600 as illustrated in FIG. 6 that is used finally as operation data in the sequence program. Note that the operation sequence data 600 in FIG. 6 is in a state in which sorting in Step S303 in FIG. 3 described later is finished.

The operation sequence data 600 in FIG. 6 includes the following respective elements converted from the respective elements of the operation timing data 501 and the synchronizing data 502 in FIG. 5. For instance, the time chart converting portion 111 uses the starting side Unit name 5021, i.e., StartUnit, on the starting side in FIG. 5 as Unit name 6011, i.e., UnitName, in FIG. 6. Still further, the time chart converting portion 111 acquires Driving method 6012, i.e., Drive, in the operation sequence data 600 in FIG. 6 from the Driving method 5012, i.e., Drive, of the operation timing data 501 in FIG. 5. In the same manner, the time chart converting portion 111 acquires Output signal information 6013, i.e., OutAddress, in the operation sequence data 600 in FIG. 6 from the Output signal information 5013, i.e., OutAddress, of the operation timing data 501 in FIG. 5 and Completion signal information 6014, i.e., InAddress, in the operation sequence data 600 in FIG. 6 from the Completion signal information 5014, i.e., InAddress, of the operation timing data 501 in FIG. 5. The time chart converting portion 111 also uses the starting side Trigger line type 5022, i.e., StartType, in FIG. 5 as Synchronizing timing type 6017, i.e., InterFaceType, in FIG. 6 and the Coil number 5023, i.e., InterFaceCoil, per Unit in FIG. 5 as Coil number 6018, i.e., InterFaceCoil, in FIG. 6. The time chart converting portion 111 generates an operation starting time of each operation data in FIG. 6 from the operation starting times 5015 and 5024, i.e., StartTime and from the operation ending times 5016 and 5027, i.e., EndTime, in FIG. 5. These times are the operation starting time 6015, i.e., StartTime, and operation ending time 6016, i.e., EndTime. Note that as for synchronized timing on the starting side of the synchronizing signal and the acknowledgment signal, the time chart converting portion 111 sets the starting point of the synchronization enabling trigger line 221 and the starting point of the synchronization completing trigger line 222 as synchronization trigger timing. Still further, the time chart converting portion 111 substitutes a value of the Operation start time 5024, i.e., StartTime, into the operation end time 6016, i.e., EndTime, as it is as ending timing.

In succession, the time chart converting portion 111 generates timing for acknowledging the operation enabling signal and the operation completing signal from the synchronizing data 502 in FIG. 5. Here, the time chart converting portion 111 extracts the ending side Unit name 5025, i.e., EndUnit, from the synchronizing data 502 in FIG. 5. Then, based on the ending side Unit name 5025, i.e., EndUnit, thus extracted, the time chart converting portion 111 uses the ending side Unit name 5025, i.e., EndUnit, in FIG. 5 as the Unit name 6011, i.e., UnitName, in FIG. 6. The time chart converting portion 111 also uses the trigger line type 5026, i.e., EndType, on the ending side in FIG. 5 as the synchronization timing type 6017, i.e., InterFaceType, in FIG. 6. Then, the time chart converting portion 111 applies the Coil number per Unit 6018, i.e., InterFaceCoil, the Operation start time 6015, i.e., StartTime and the Operation end time 6016, i.e., EndTime, to these operation data, respectively. As fir the ending side synchronizing timing of the synchronizing signal and the acknowledgment signal, the ending point of the synchronization enabling trigger line 221 and the ending point of the synchronization completion trigger line 222 are set as synchronization trigger timing. Therefore, the time chart convening portion 111 substitutes a value of the operation end time 5027, i.e., EndTime. of the synchronizing data 502 in FIG. 5 to the operation start time 6015, i.e., StartTime, as it is in FIG. 6.

Next, the time chart converting portion 111 sorts the operation data per Unit and per operation sequence in Step S303 in FIG. 3. Here, sort keys are per Unit and time information related to the operation sequence. As for the time information in particular, the time chart converting portion 111 sets the operation start time 6015, i.e., StartTime, as first priority information. The time chart converting portion 111 also sets the operation end time 6016, i.e., EndTime, as second priority information such that the process of the sequence order is prioritized over the operation process of the control object. Then, in a case where a plurality of synchronizing timings is simultaneous, the time chart converting portion 111 adjusts the synchronizing timings to be put into a sequence order of Kanryo meaning "completion"→Kyoka meaning "permission"→KanryoWait meaning to"wait for completion"→Kyokawait meaning to "wait for permission". The time chart converting portion 111 performs this adjustment by setting the type of the synchronizing timing, i.e., InterFaceType, as third priority information. It is possible to acquire the operation sequence data 600 sorted by the time information per Unit as illustrated in FIG. 6 by sorting the operation data per Unit under such sorting conditions.

Next, the time chart converting portion 111 in FIG. 1 generates a corresponding sequence program based on the operation sequence data 600 in FIG. 6. That is, the time chart converting portion 111 stores the operation sequence data 600 per Unit generated as described above into the time chart information storage portion 112.

In succession, the sequence program generating portion 113 generates the sequence program based on the operation sequence data 600 in FIG. 6 acquired from the time chart 201 in FIG. 4. At this time, the sequence program generating portion 113 generates the sequence program based on the operation sequence data 600 in FIG. 6 sorted per Unit within the time chart information storage portion 112. In generating the sequence program, the sequence program generating portion 113 uses the allocation of the internal device addresses in the model program of the sequence program prepared in advance in the control information storage portion 121.

Figure 7:
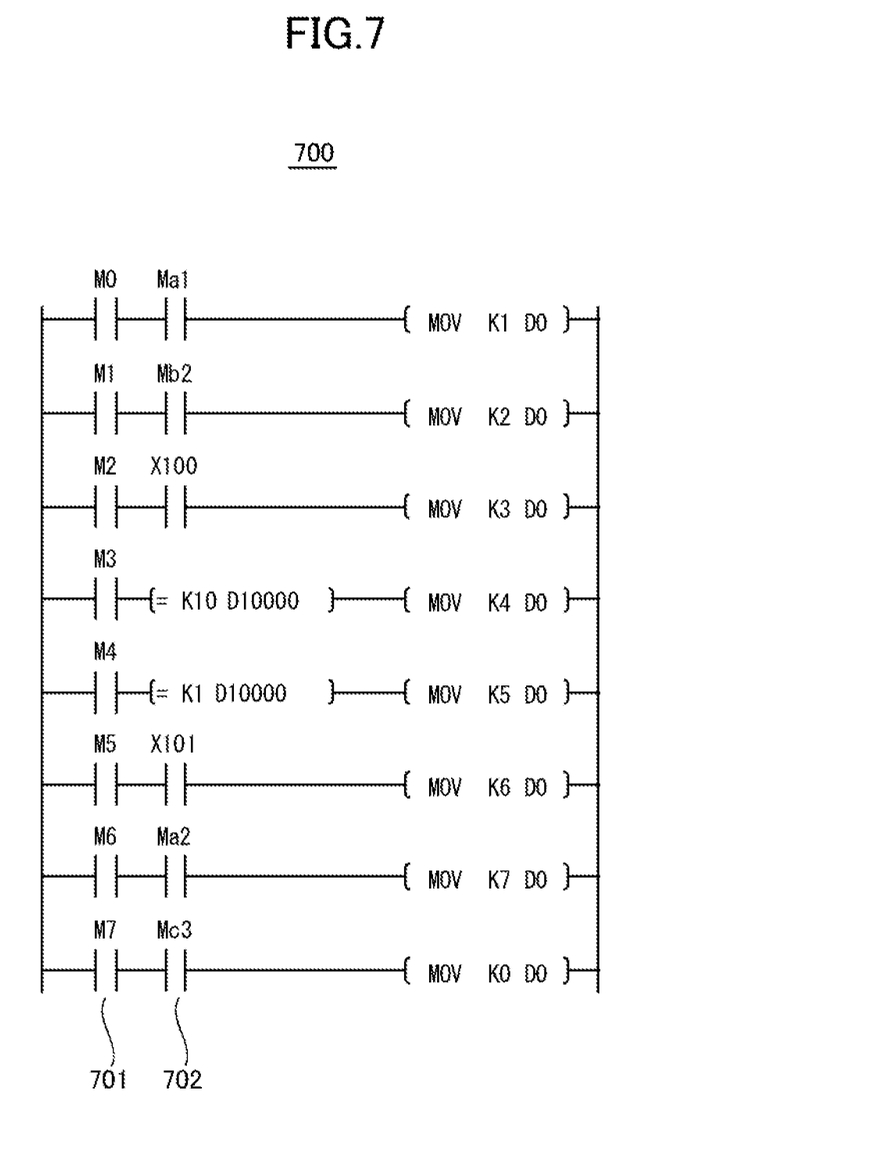
FIG. 7 illustrates one example of the generated sequence program in a form of a ladder circuit.

Thus, the sequence program as illustrated in FIG. 7 for example is outputted. The sequence program in FIG. 7 is illustrated graphically in a form of a ladder circuit of only the part of the sorted the Unit A in an upper level in FIG. 6. In the ladder circuit 700, i.e., the sequence program, in FIG. 7, circuits 701 are composed of circuits M1 through M7 corresponding to seven lines of the part of the Unit A in the upper level in FIG. 6. Elements 702 of these circuits M1 through M7 are generated by using the output signal information 6013, i.e., OutAddress, the completion signal information 6014, i.e., InAddress, the synchronizing timing type 6017, i.e., InterFaceType and others. Note that what can be actually outputted from the sequence program output portion 114 to the PLC is binary data for example which is equivalent to the ladder circuit in FIG. 7, is registerable in the PLC and which can be executed by the PLC. In general, a program executable form loadable in the PLC is a form of binary data in which mnemonic and binary code are disposed in a predetermined format.

The sequence program generated as described above can be utilized in a production system for manufacturing articles. That is, each Unit composed of a plurality of control objects is controlled by executing the generated sequence program by a controller such as the PLC controlling each Unit. This arrangement makes it possible to control assembly and machining works implemented on workpieces in each Unit and to manufacture the articles in the production system composed of the respective Units.

It is possible to describe the interlocking modes by the graphical elements in the time chart even in a case where a plurality of acknowledgment signals is used in response to synchronizing signal as illustrated in the exemplary embodiment described above. It is then possible to automatically generate the sequence program that precisely presents the interlocking modes from the time chart.

It is possible to realize the present disclosure by a program that realizes one or more functions of the exemplary embodiments described above and that is supplied to a system or an apparatus through a network or a storage medium or even by a process executed by reading the program by one or more processors in a computer of the system or the apparatus. It is also possible to realize by a circuit, e.g., ASIC, that realizes one or more functions. Still further, the exemplary embodiment described above is applicable to a machine that can automatically make a telescopic motion, bending and stretching motions, a vertical motion, a horizontal motion or a swiveling motion or their complex motion based on information of a storage device provided in the control Unit as an object to be controlled by the sequence program.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-051683, filed Mar. 23, 2020, which is hereby incorporated by reference herein in its entirety.

What is claimed is:

1. An information processing method in which a processor in an information processing apparatus is configured to acquire an information for controlling a plurality of control objects, the information processing method comprising:
   acquiring, by the processor of the information processing apparatus, a time chart indicating operation lines corresponding to operations of the plurality of control objects and interlocking modes between the operations;
   converting, by the processor, the time chart into model programs of a sequence program based on a permission completion waiting circuit, a permission waiting circuit, and a completion circuit as the model programs,
   wherein the permission completion waiting circuit is a circuit of advancing to a next step by outputting an operation enabling signal of an interference operation to one of the plurality of control objects and by acknowledging an output of a completion signal informing that the interference operation has been completed from the control object to which the operation enabling signal had been output,
   wherein the permission waiting circuit is a circuit of advancing to a next step by acknowledging an enabling signal of an interference operation, and
   wherein the completion circuit is a circuit of causing a control object to which an enabling signal of an interference operation had been output to output a completion signal informing that the interference operation has been completed and of acknowledging that the output of the enabling signal with respect to the interference operation is expired;
   generating, by the processor of the information processing apparatus, the sequence program corresponding to the operations of the plurality of control objects based on the time chart and the model programs; and,
   outputting, by the processor of the information processing apparatus, the sequence program,
   wherein the output sequence program causes the plurality of control objects to be operated by being executed by a controller configured to control the plurality of control objects,
   wherein the time chart includes a diagram part in which the operation lines corresponding to the operations of the plurality of control objects and graphical elements corresponding to the interlocking modes between the operations are indicated, and a content indication part indicating contents of the operations corresponding to the plurality of control objects,
   wherein the time chart allows a user to input or edit data,
   wherein in response to input and/or edit for one of the diagram part and the content indication part is made, the processor of the information processing apparatus updates the other of the diagram part and the content indication part so to match with the input and/or the edit,
   wherein the content indication part and the diagram part are displayed on a same display portion by the processor, and the processor is configured to indicate an update of at least one of the operation line, the graphical elements, and the contents in the same display portion in response to the input and/or the edit.

2. The information processing method according to claim 1, wherein the interlocking modes are indicated by the graphical elements on the time chart based on a synchronizing signal and an acknowledgment signal between the operations.

3. The information processing method according to claim 2, wherein control information of the synchronizing signal and/or the acknowledgment signal is correlated with the graphical elements/a graphical element in the time chart.

4. The information processing method according to claim 2, wherein in a case where the interlocking mods are inputted by a user, the processor is configured to indicate items corresponding to the synchronizing signal and the acknowledgment signal in a manner of a pulldown menu in the content indication part so as the user to select one of the items.

5. The information processing method according to claim 1, further comprising:
  acquiring operation timing data and synchronizing data in the operations based on the operation lines and the interlocking modes.

6. The information processing method according to claim 5, further comprising:
  generating the sequence program based on the operation timing data and the synchronizing data.

7. The information processing method according to claim 6, wherein, in generating the sequence program, operation data corresponding to the operations based on the operation timing data of the plurality of control objects and starting and ending timings of a synchronizing signal and/or an acknowledgment signal included in the synchronizing data are generated.

8. The information processing method according to claim 7, wherein, in generating the sequence program, the operation data are sorted per plurality of control objects based on the operation timing data of the plurality of control objects and on a signal type of the synchronizing signal and/or the acknowledgment signal included in the synchronizing data.

9. The information processing method according to claim 8, wherein operation data of which operation timings are simultaneous are sorted based on a sequence order of the signal type.

10. The information processing method according to claim 9, wherein the signal type includes four types of "completion", "permission", "wait for completion", and "wait for permission", and
  the sequence order is a sequence order of "completion", "permission", "wait for completion", and "wait for permission".

11. The information processing method according to claim 6, wherein the sequence program is generated based on the operation timing data, the synchronizing data, and model data for the sequence program.

12. The information processing method according to claim 5, further comprising:
  acquiring a signal type of synchronizing signals and/or acknowledgment signals in the plurality of control objects for which the interlocking modes are defined by graphical elements and starting and ending timings of the respective signals as the synchronizing data.

13. The information processing method according to claim 5, further comprising:
  acquiring the operation timing data corresponding to operations of the plurality of control objects based on the operation lines.

14. The information processing method according to claim 1, wherein the interlocking mode is indicated by first and second trigger lines.

15. The information processing method according to claim 14, wherein a terminal end of the first trigger line is indicated by a diamond shape or a rectangular shape and a terminal end of the second trigger line is indicated by an arrowhead shape or an angular shape.

16. The information processing method according to claim 14, wherein one of the first and second trigger lines indicates permission of synchronization among the operations and another one thereof indicates completion of the synchronization.

17. The information processing method according to claim 14, wherein the processor is configured to acquire synchronizing data based on a time, a unit name and a specifications of a signal at a start point of the first trigger line, a time, a unit name and a specifications of a signal at an end point of the first trigger line, a time, a unit name and a specifications of a signal at a start point of the second trigger line, and a time, a unit name and a specifications of a signal at an end point of the second trigger line in the time chart.

18. The information processing method according to claim 1, wherein the sequence program is a ladder program.

19. A non-transitory computer-readable storage medium configured to store a control program capable of executing the information processing method according to claim 1 by a computer.

20. The information processing method according to claim 1, wherein the content indication part includes input fields for a unit name, an operation name, a driving method, an output signal, a completion signal, and an operation direction.

21. The information processing method according to claim 1, wherein a warning is outputted if information inputted or edited for one of the diagram part and the content indication part is contrary to information on the other of the diagram part and the content indication part.

22. The information processing method according to claim 1, wherein the display portion is a display panel.

23. The information processing method according to claim 1, wherein the content indication part includes a unit name field, an operation name field, a driving method field, an operation signal field, a completion signal field, and an operation direction field, and
  wherein the diagram part includes a time indicating portion indicating a time base.

24. The information processing method according to claim 1, wherein the processor is configured to acquire operation timing data based on a time, a unit name and a specifications of a signal at a start point of an operation status transition line, and a time, a unit name and a specifications of a signal at an end point of an operation status transition line in the time chart.

25. An information processing apparatus comprising:
  a processor configured to, acquire a time chart in indicating operation lines corresponding to operations of a plurality of control objects and an interlocking mode between the operations,
  wherein the processor is configured to convert the time chart into model programs of a sequence program based on a permission completion waiting circuit, a permission waiting circuit, and a completion circuit as the model programs,
  wherein the permission completion waiting circuit is a circuit of advancing to a next step by outputting an operation enabling signal of an interference operation to one of the plurality of control objects and by acknowledging an output of a completion signal informing that the interference operation has been completed from the control object to which the operation enabling signal had been output, wherein the permission waiting circuit is a circuit of advancing to a next step by acknowledging an enabling signal of an interference operation, and wherein the completion circuit is a circuit of causing a control object to which an enabling signal of an interference operation had been outputted to output a completion signal informing that the interference operation has been completed and of acknowledging that the output of the enabling signal with respect to the interference operation is expired;

and generate a sequence program corresponding to the operations of the plurality of control objects based on the time chart and the generated program models, wherein the processor is configured to output the generated sequence program, and the output sequence program causes the plurality of control objects to be operated by being executed by a controller configured to control the plurality of control objects, wherein the time chart includes a diagram part in which the operation lines corresponding to the operations of the plurality of control objects and graphical elements corresponding to the interlocking modes between the operations are indicated, and a content indication part indicating contents of the operations corresponding to the plurality of control objects, wherein the time chart allows a user to input or edit data, wherein in response to input and/or edit for one of the diagram part and the content indication part is made, the processor is configured to update the other of the diagram part and the content indication part to match with the input and/or the edit, wherein the processor is configured to display the content indication part and the diagram part on a same display portion, and indicate an update of at least one of the operation line, the graphical elements, and the contents in the same display portion in response to the input and/or the edit.

26. The information processing apparatus according to claim 25, wherein the interlocking modes are indicated by the graphical elements on the time chart based on a synchronizing signal and an acknowledgment signal between the operations through a graphic user interface.

27. The information processing apparatus according to claim 26, wherein in a case where either one of the graphical element, the synchronizing signal or the acknowledgment signal is changed through the user interface, another one is updated corresponding to the change.

28. A production system configured to manufacture articles, comprising:
the information processing apparatus according to claim 25; and
a production unit comprising the plurality of control objects.

29. An article manufacturing method manufacturing articles by using the production system according to claim 28.

30. The information processing apparatus according to claim 25, wherein the display portion is a display panel.

* * * * *